(12) United States Patent
Glasmachers

(10) Patent No.: US 11,036,860 B2
(45) Date of Patent: Jun. 15, 2021

(54) ELECTRICAL APPARATUS HAVING A SECURED AND AN UNSECURED FUNCTIONAL UNIT

(71) Applicant: KROHNE Messtechnik GmbH, Duisburg (DE)

(72) Inventor: Holger Glasmachers, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 127 days.

(21) Appl. No.: 16/247,013

(22) Filed: Jan. 14, 2019

(65) Prior Publication Data

US 2019/0220600 A1 Jul. 18, 2019

(30) Foreign Application Priority Data

Jan. 12, 2018 (DE) .......................... 102018100627.6

(51) Int. Cl.
*G06F 21/57* (2013.01)
*G06F 21/81* (2013.01)
*H02H 3/05* (2006.01)
*G06F 21/55* (2013.01)
*H02J 1/14* (2006.01)
*G06F 1/28* (2006.01)
(Continued)

(52) U.S. Cl.
CPC .............. *G06F 21/57* (2013.01); *G06F 1/28* (2013.01); *G06F 1/3206* (2013.01); *G06F 21/552* (2013.01); *G06F 21/81* (2013.01); *H02H 3/05* (2013.01); *H02J 1/14* (2013.01); *B60R 16/03* (2013.01); *G06F 2221/034* (2013.01)

(58) Field of Classification Search
CPC .......... G06F 21/57; G06F 1/28; G06F 1/3206; G06F 21/552; G06F 21/81; G06F 2221/034; H02H 3/05; H02J 1/14; B60R 16/03
See application file for complete search history.

(56) References Cited

U.S. PATENT DOCUMENTS 10,291,506 B2 * 5/2019 Mixer ..................... H04L 43/04
2007/0022474 A1 1/2007 Rowett et al.
(Continued)

FOREIGN PATENT DOCUMENTS

DE 4033313 A1 6/1991

*Primary Examiner* — Joseph P Hirl
*Assistant Examiner* — Stephen T Gundry
(74) *Attorney, Agent, or Firm* — Whitmyer IP Group

(57) ABSTRACT

An electrical apparatus includes a secured functional unit, an unsecured functional unit and a supply device. The secured functional unit has a first interface device for secure communication and a control unit, and the unsecured functional unit has a second interface device for non-secure communication. The secured functional unit and the unsecured functional unit are designed for communicating with one another. The supply device further includes a supply unit. A first power path for supplying the secured functional unit is arranged between the supply unit and the secured functional unit, and a second power path for supplying the secured functional unit with electrical energy from the supply unit is arranged between the supply unit and the unsecured functional unit. A switch is arranged in the second power path. A second power path in the switch is looped in the first switching state and disconnected in the second switching state.

10 Claims, 3 Drawing Sheets

(51) Int. Cl.
    *G06F 1/3206*     (2019.01)
    *B60R 16/03*     (2006.01)

(56) References Cited

U.S. PATENT DOCUMENTS

| | | | |
|---|---|---|---|
| 2007/0162974 A1* | 7/2007 | Speidel | H04L 63/1425 726/22 |
| 2012/0226572 A1* | 9/2012 | Park | H02J 3/32 705/26.1 |
| 2014/0096226 A1* | 4/2014 | Barkan | G06F 21/57 726/11 |
| 2016/0205215 A1* | 7/2016 | Mraz | G06F 9/5077 709/219 |
| 2016/0261482 A1* | 9/2016 | Mixer | H04L 63/00 |
| 2017/0214533 A1* | 7/2017 | Chen | H04L 12/10 |
| 2017/0317982 A1* | 11/2017 | Glasmachers | G06F 21/82 |
| 2018/0375842 A1* | 12/2018 | Aschauer | H04L 63/0485 |
| 2019/0044696 A1* | 2/2019 | Aschauer | H04L 9/0897 |
| 2019/0065787 A1* | 2/2019 | Bildhaiya | G07C 5/0808 |
| 2019/0108696 A1* | 4/2019 | Wendling | G06F 21/35 |
| 2019/0138726 A1* | 5/2019 | Leal Monteiro | G06F 21/85 |
| 2019/0181629 A1* | 6/2019 | Burk | H05B 47/105 |
| 2019/0220598 A1* | 7/2019 | Glasmachers | H04L 63/1425 |
| 2019/0332813 A1* | 10/2019 | Berthet | G06F 21/86 |
| 2020/0050753 A1* | 2/2020 | Davis | G01R 22/10 |
| 2020/0099250 A1* | 3/2020 | Allahut | H02J 9/061 |
| 2020/0195008 A1* | 6/2020 | Cheng | H02J 3/14 |
| 2020/0259335 A1* | 8/2020 | Weidauer | H02J 13/0006 |
| 2020/0280182 A1* | 9/2020 | Walther | H04L 12/40045 |

\* cited by examiner

ELECTRICAL APPARATUS HAVING A SECURED AND AN UNSECURED FUNCTIONAL UNIT

TECHNICAL FIELD

The invention relates to an electrical apparatus having a secured functional unit, an unsecured functional unit and a supply device, wherein the secured functional unit has a first interface device for secure communication and a control unit, and the unsecured functional unit has a second interface device for non-secure communication, and wherein the secured functional unit and the unsecured functional unit are designed for communicating with one another. The control device is often designed to interrupt and/or restrict the communication between the secured and unsecured functional unit, which contributes to a protection of the secured functional unit in comparison to the unsecured functional unit. One limitation, for example, is that information can only be communicated from the secured to the unsecured functional unit. In addition to the interface device, a functional unit usually has other components that implement other functions.

BACKGROUND

Electrical apparatuses of the specified type are used, for example, in industrial systems. Industrial systems with these electrical apparatuses usually also use other electrical equipment, such as process control systems or computer systems, which also have interface devices. At least some of the electrical equipment, including the electrical apparatuses, of an industrial system are connected to a transmitting medium via the interface device and communicate with one another via this medium.

Communication is generally the transmission of information by signals. Communication in industrial systems is usually divided into secure communication on the one hand and non-secure communication on the other. With secure communication, the transmitted information is protected against tampering so that its integrity is guaranteed. This is not the case with non-secure communication. Secure communication uses measures to at least make it more difficult to manipulate information and, ideally, make it impossible. Accordingly, secure communication takes place with interfaces for secure communication and non-secure communication with interfaces for non-secure communication. On the one hand, the operator of an industrial system and, on the other hand, the type of industrial system both contribute to what is considered secure and what is considered non-secure. A general definition is not possible.

Usually, an electrical apparatus of the type described in an industrial system is connected via the first interface device to other devices of the industrial system for secure communication. Furthermore, the second interface device is often used for non-secure communication, for example to read certain information from the electrical apparatus using any auxiliary devices. This communication is regarded as non-secure and the second interface as a weak point in the industrial system due to the access of any auxiliary devices to the second interface device.

This vulnerability often allows the industrial system to be compromised by an attack. This is because it has been recognized that it is possible in electrical apparatuses of the type described to access the unsecured functional unit via the second interface device and to increase the power consumption of the unsecured functional unit to such an extent that the supply device can no longer provide sufficient power for the secured functional unit. If the secured functional unit is no longer supplied with sufficient power, its function is no longer guaranteed. Due to the connection of the secured functional unit with other devices of the industrial system, these other devices are also impaired.

SUMMARY

An object of the present invention is thus to provide an electrical apparatus for which the weak point indicated is no longer present or, in any case, has been reduced.

The object is achieved with an electrical apparatus of the type described using a first teaching according to the present invention. The supply device has a first supply unit and a second supply unit, wherein the first supply unit and the second supply unit are separate from one another. During operation of the electrical apparatus, the first supply unit supplies the secure functional unit and the second supply unit supplies the unsecured functional unit with electrical energy. For this, a first power path is arranged between the first supply unit and the secured functional unit and a second power path is arranged between the second supply unit and the unsecured functional unit. The first and second power paths are also separate.

The separate design of the supply units means that they supply the respective functional unit with electrical energy independently of one another. Independent supply means that the failure or impairment of one of the supply units has no effect on the other supply unit, so that the other supply unit can continue to supply the corresponding functional unit with sufficient electrical energy. Thus the described weak point is eliminated.

The object is also achieved with an electrical apparatus of the type described by a second teaching according to the present invention. The supply device has a supply unit. A first power path for supplying the secured functional unit is arranged between the supply unit and the secured functional unit and a second power path for supplying the secured functional unit with electrical energy from the supply unit is arranged between the supply unit and the unsecured functional unit. Further, a power limiting device is arranged in the second power path. The power limiting device is designed to limit power transmission via the power limiting device so that a power that can be delivered by the supply unit is, in any case, sufficient for supplying the secured functional unit.

The object is also achieved with an electrical apparatus of the type described by a third teaching according to the present invention. The supply device has a supply unit. A first power path for supplying the secured functional unit is arranged between the supply unit and the secured functional unit and a second power path for supplying the secured functional unit with electrical energy from the supply unit is arranged between the supply unit and the unsecured functional unit. Further, a switch is arranged in the second power path, which can be set in a first switching state and in a second switching state. The second power path in the switch is looped in in the first switching state and disconnected in the second switching state. During operation of the electrical apparatus, the control unit sets the switch in the first switching state, monitors the intended function of the unsecured functional unit using an indicator representing power consumption of the unsecured functional unit. The control unit sets the switch from a first switching state into the second switching state when a predetermined indicator limit value is exceeded. The looping-in of a path, such as the second power path, using a switch means that the path is uninterrupted in the switch. The default indicator limit is usually stored in the control unit.

In contrast to the electrical apparatus according to the first teaching, the electrical apparatus according to the second and third teachings has a supply unit which supplies both the secured and the unsecured functional unit with electrical energy during operation.

To ensure that an attack only affects the unsecured functional unit but not the secured functional unit, the electrical apparatus has the power limiting device in the second power path according to the second teaching. This means that in the event of an attack, the drawing of electrical power from the supply device by the unsecured functional unit does not increase to such an extent that the supply device can no longer provide sufficient power for the secured functional unit.

It is provided in one design of the electrical apparatus that the power limiting device is an integrated circuit.

So that an attack only affects the unsecured functional unit but not the secured functional unit, the electrical apparatus according to the third teaching comprises the switch that can be set in the second power path and the control unit is designed to set the switch. During operation of the electrical apparatus, the control unit generally sets the switch to the first switching state so that the second power path is looped in in the switch. Furthermore, the control unit monitors the intended function of the unsecured functional unit using the indicator. The indicator reflects the power consumption of the unsecured functional unit. The use of such an indicator is based on the knowledge that an attack, in order to be successful, must increase the power consumption of the unsecured functional unit to such an extent that the supply unit can no longer provide sufficient power for both functional units. If the power consumption is increased by an attack, the function of the unsecured functional unit is no longer as intended. A maximum power that can be provided by the supply unit is therefore a measure of the predeterminable indicator limit value. If, during monitoring, the control unit detects that the indicator limit value has been exceeded, it sets the switch from the first to the second switching state. Accordingly, an attack via the second interface device has no effect on the secured functional unit and thus remedies the described vulnerability.

According to the teachings, the supply device has at least one supply unit. A supply unit supplies a consumer, such as the secured and/or unsecured functional unit, with electrical energy so that its intended function is given. For this, the supply unit provides a constant voltage at a current dependent on the consumer or a constant current at a voltage dependent on the consumer.

The supply devices draws the necessary electrical energy from a supply source outside the electrical apparatus. If the electrical apparatus is connected to a current loop, for example, via the first interface device for secure communication, the supply of electrical energy from this loop is an appropriate option. For this, the supply device is also connected to the current loop so that it is supplied by it. It is also possible to communicate via the first interface device using analog current signals, for example according to the standard with 4 mA to 20 mA, and/or with digital signals, for example according to the HART standard. The first interface is then a current interface.

It is possible that an attack via the second interface device is successful. In the event of a successful attack, the supply unit that supplies both the secured and unsecured functional unit is overloaded, so that it can no longer provide sufficient power for the secured functional unit. As a result, the intended function of the secured functional unit is no longer guaranteed, which also means that the control unit no longer sets the switch. This circumstance is, however, exploited in a design of the electrical apparatus to further reduce the previously described weak point in that the switch is in the second switching state when not actuated. The switch is thus designed in such a manner that it is in its second switching state without being set by the control device. Since, however, in this switching state, supply to the unsecured functional unit via the second power path is disconnected, sufficient energy is again available to supply the secured functional unit, so that it resumes its intended function.

During operation, the control unit monitors the intended function of the unsecured functional unit by using an indicator representing the power consumption of the unsecured functional unit. Various signals reflecting the power consumption of the unsecured functional unit can be used as indicators.

It is provided in one design that the indicator is a supply voltage on the second power path and the indicator limit value is a supply limit voltage and that the control unit measures the supply voltage during operation. The control unit is accordingly designed to measure the supply voltage. If the unsecured functional unit is successfully attacked, the intended function is no longer given and the power consumption increases, which results in a drop in the supply voltage. The supply limit voltage therefore lies between the supply voltage for the intended function and the reduced supply voltage for the improper function. In the event of a successful attack, the supply limiting voltage is exceeded from the top down.

In a further design it is provided that the indicator is a supply current through the second power path and the indicator limit value is a supply limit current and the control unit measures the supply current during operation. The control unit is accordingly designed to measure the supply current. If the unsecured functional unit is successfully attacked, the intended function is no longer given and the power consumption increases, resulting in an increase in the supply current. The supply limit current therefore lies between the supply current with the intended function and the increased supply current with the improper function. In the event of a successful attack, the supply limiting current is exceeded from the bottom up.

In the two preceding designs, either the supply voltage or the supply current is used as an indicator. Supply voltage and supply current together determine the power consumption of the unsecured functional unit. For this reason, a further design stipulates that the indicator is the power consumption via the second power signal path and the indicator limit value is a power limit consumption and that the control unit determines the power consumption during operation. Accordingly, the control unit is designed both for measuring the supply voltage and the supply current and for determining the power consumption from the measured supply voltage and the measured supply current. If the unsecured functional unit is successfully attacked, the intended function is no longer given and the power consumption increases. The power limit consumption therefore lies between the power consumption with the intended function and the increased power consumption with the improper function. In the event of a successful attack, the power limit consumption is exceeded from the bottom up.

The first interface device is designed for secure communication and the second for non-secure communication. The formation of the second interface device only for non-secure and not for secure communication is usually a consequence of the configuration of the second interface device, for example to be able to read information from the electrical apparatus using auxiliary devices such as laptops or tablets. In a further configuration of an electrical apparatus, it is provided that the first interface device is designed as a wire-bound interface and the second interface device as a wireless interface. The design of the first interface device as a wire-bound interface contributes to the security of communication, since access to execute an attack on a wire-bound interface is more difficult than, for example, access to a wireless interface. The design of the second interface device as a wireless interface contributes to the accessibility of auxiliary equipment with the aforementioned consequences.

In a further design, it is provided that the electrical apparatus is designed for use in the process industry.

In a further design, it is provided that the electrical apparatus is designed as a field device.

BRIEF DESCRIPTION OF THE DRAWINGS

In detail, there is a plurality of possibilities for designing and further developing the electrical apparatus. Reference is made to the following description of three preferred embodiments in conjunction with the drawings.

DETAILED DESCRIPTION

Figure 1:
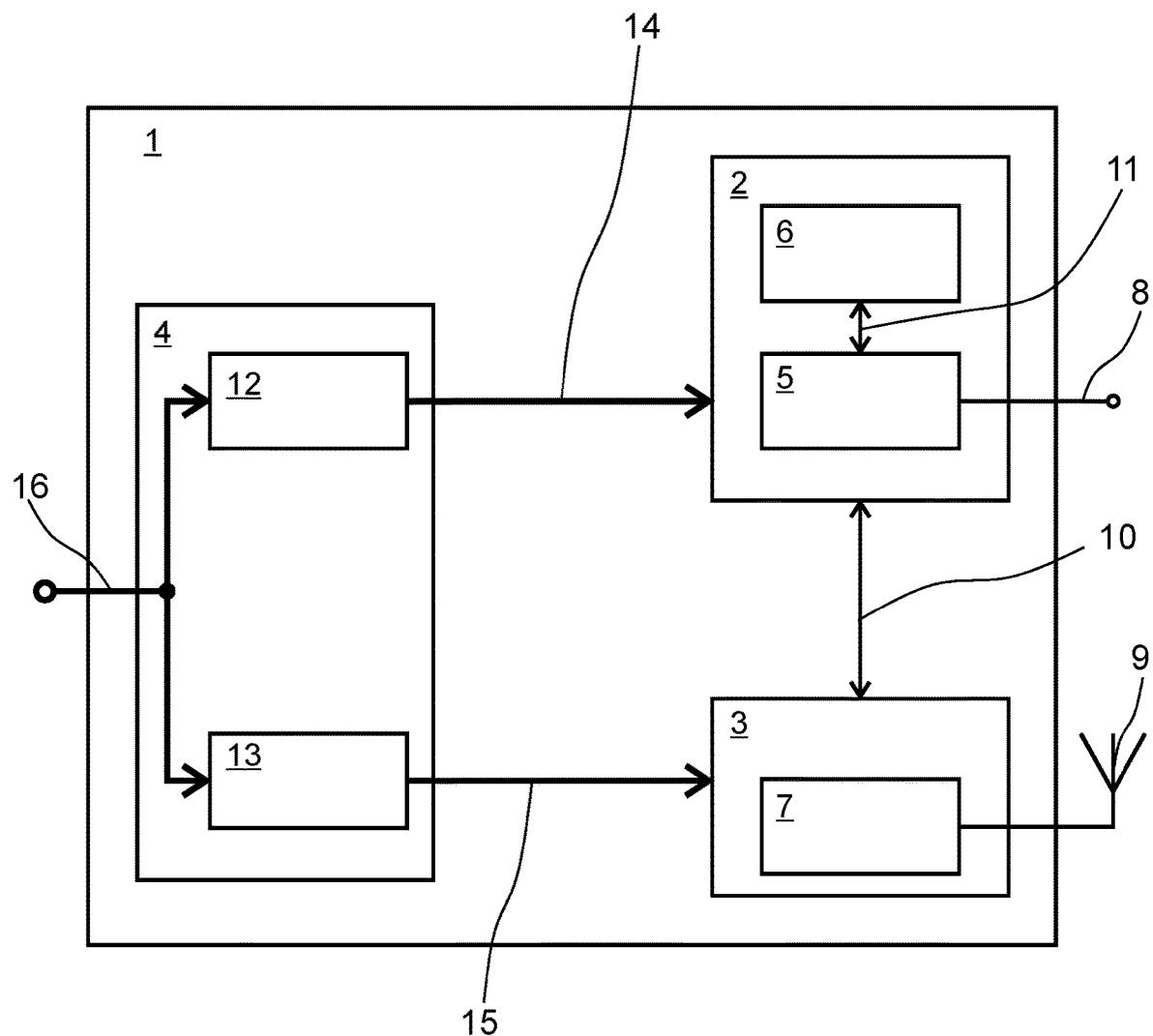
FIG. 1 provides a first embodiment of an electrical apparatus.

FIG. 1 shows the essential features of a first embodiment of an electrical apparatus 1, which is designed as a field device and for use in the process industry. The electrical apparatus 1 initially has a secured functional unit 2, an unsecured functional unit 3 and a supply device 4.

The secured functional unit 2 has a first interface device 5 and a control unit 6 and the unsecured functional unit 3 has a second interface device 7. The first interface device 5 is designed as a wire-bound interface for secure communication and the second interface device 7 is designed as a wireless interface for non-secure communication. For this, the first interface device 5 designed as a wire-bound interface has an interface connection 8 for a wire-bound transmitting medium and the second interface device 7 designed as a wireless interface has an antenna 9. The secured functional unit 2 and the unsecured functional unit 3 are designed for communication with one another via a first communication channel 10. The control unit 6 and the first interface device 5 are also designed for communication with one another, namely via a second communication channel 11.

The supply device 4 has a first supply unit 12 and a second supply unit 13. The first supply unit 12 and the second supply unit 13 are separate from one another. During operation of the electrical apparatus 1, the first supply unit 12 supplies the secured functional unit 2 and the second supply unit 13 supplies the unsecured functional unit 3 with electrical energy. To supply the secured functional unit 2 with electrical energy through the first supply unit 12, a first power path 14 is arranged between the first supply unit 12 and the secured functional unit 2. Accordingly, a second power path 15 is arranged between the second supply unit 13 and the unsecured functional unit 3. The energy required for operation is supplied to the electrical apparatus 1 via a third power path 16, which must be connected to an external supply source. The energy supplied via the third power path 16 is first supplied to the first supply unit 12 and the second supply unit 13 and then, from them, to the secured functional unit 2 and the unsecured functional unit 3.

Figure 2:
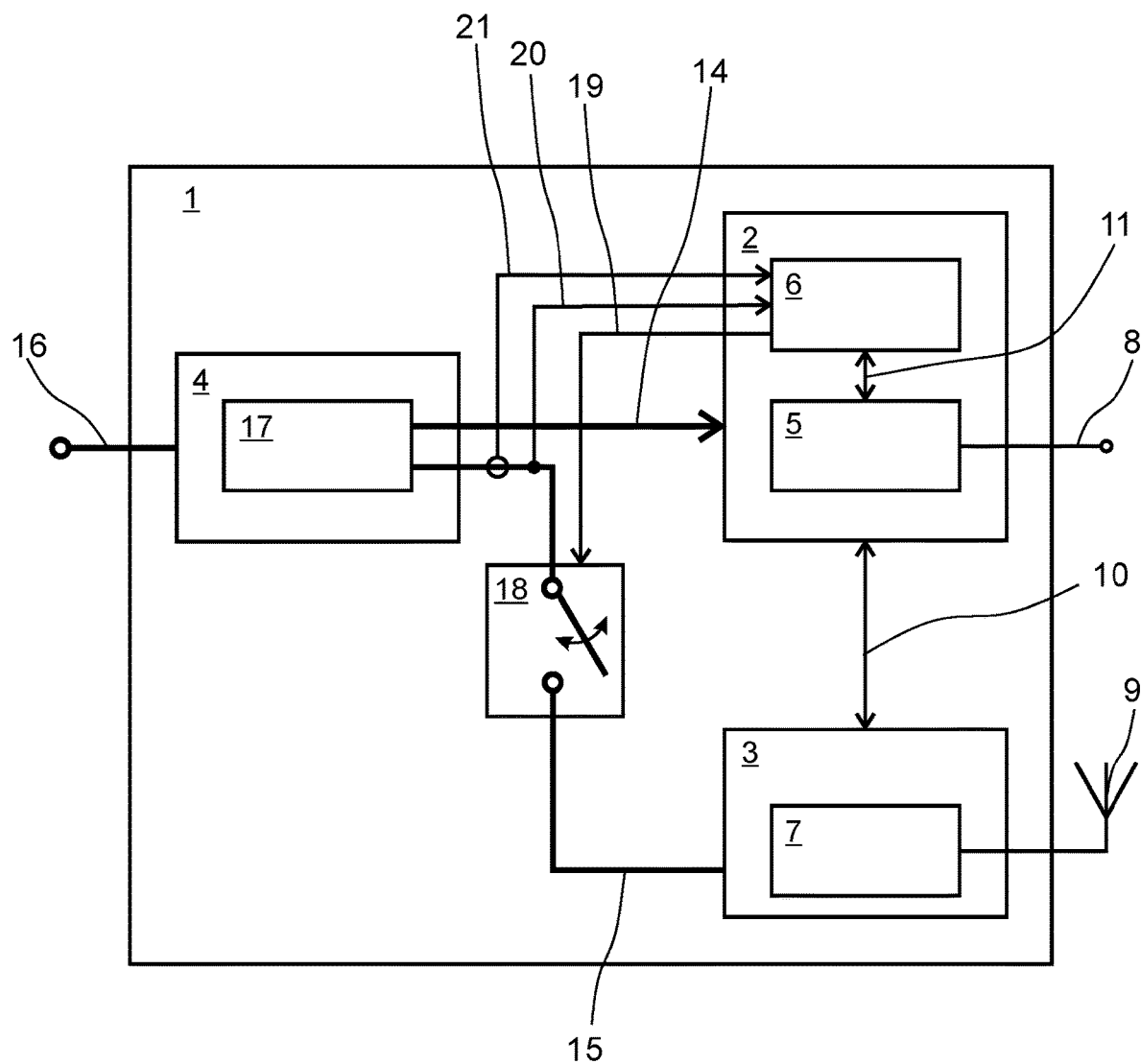
FIG. 2 provides a second embodiment of an electrical apparatus.

FIG. 2 shows the essential features of a second embodiment of an electrical apparatus 1, which is designed as a field device and for use in the process industry. The electrical apparatus initially has a secured functional unit 2, an unsecured functional unit 3 and a supply device 4.

The secured functional unit 2 has a first interface device 5 and a control unit 6 and the unsecured functional unit 3 has a second interface device 7. The first interface device 5 is designed as a wire-bound interface for secure communication and the second interface device 7 is designed as a wireless interface for non-secure communication. For this, the first interface device 5 designed as a wire-bound interface has an interface connection 8 for a wire-bound transmitting medium and the second interface device 7 designed as a wireless interface has an antenna 9. The secured functional unit 2 and the unsecured functional unit 3 are designed for communication with one another via a first communication channel 10. The control unit 6 and the first interface device 5 are also designed for communication with one another, namely via a second communication channel 11.

The supply device 4 has a single supply unit 17. During operation of the electrical apparatus 1, the supply unit 17 supplies the secured functional unit 2 and the unsecured functional unit 3 with electrical energy. For this, a first power path 14 is arranged between the supply unit 17 and the secured functional unit 2 and a second power path 15 is arranged between the supply unit 17 and the unsecured functional unit 3. The energy required for operation is supplied to the electrical apparatus 1 via a third power path 16, which must be connected to an external supply source. The energy supplied via the third power path 16 is first supplied to the supply unit 17 and then to the secured functional unit 2 and the unsecured functional unit 3.

A switch 18 is arranged in the second power path 15. The switch 18 can be set in a first switching state and in a second switching state. The second power path 15 in the switch 18 is looped in the first switching state and disconnected in the second switching state. This means that the unsecured functional unit 3 is supplied by the supply unit 17 in the first switching state and not in the second switching state. The control unit 6 is designed to set the switch 18. Actuation is effected via a control path 19. Thus the control unit 6 can set the switch 18 either to the first switching state or to the second switching state. The switch 18 is designed in such a manner that it is in the second switching state if it is not actuated by the control unit 6.

During operation of the electrical apparatus 1, the control unit 6 first sets the switch 18 to the first switching state. In addition, the control unit 6 monitors the intended function of the unsecured functional unit 3 using an indicator representing the power consumption of the unsecured functional unit 3. If the control unit 6 determines that a predetermined indicator limit value has been exceeded, it sets the switch 18 into the second switching state.

In this embodiment of the electrical apparatus 1, the indicator is a power consumption of the unsecured functional unit 3 via the second power signal path 15 and the indicator limit value is a power limit consumption. The control unit 6 determines the power consumption of the unsecured functional unit 3 during operation of the electrical apparatus 1. For this, the control unit 6 is designed both for measuring a supply voltage on the second power path 15 and for measuring a supply current through the second power path 15. The supply voltage is measured via a voltage measuring path 20 and the supply current is measured via a current measuring path 21. The supply current is measured, for example, inductively or via a shunt in the second power path 15. The control unit 6 is also designed to determine the power consumption of the unsecured functional unit 3 from the measured supply voltage and the measured supply current. If the unsecured functional unit 3 is now successfully attacked, its intended function is no longer given and the power consumption increases. For this reason, the power limit consumption specified for and stored in the control unit 6 lies between the power consumption for the intended function and the increased power consumption for the improper function. In the event of an attack, the power limit consumption is exceeded from the bottom up.

Figure 3:
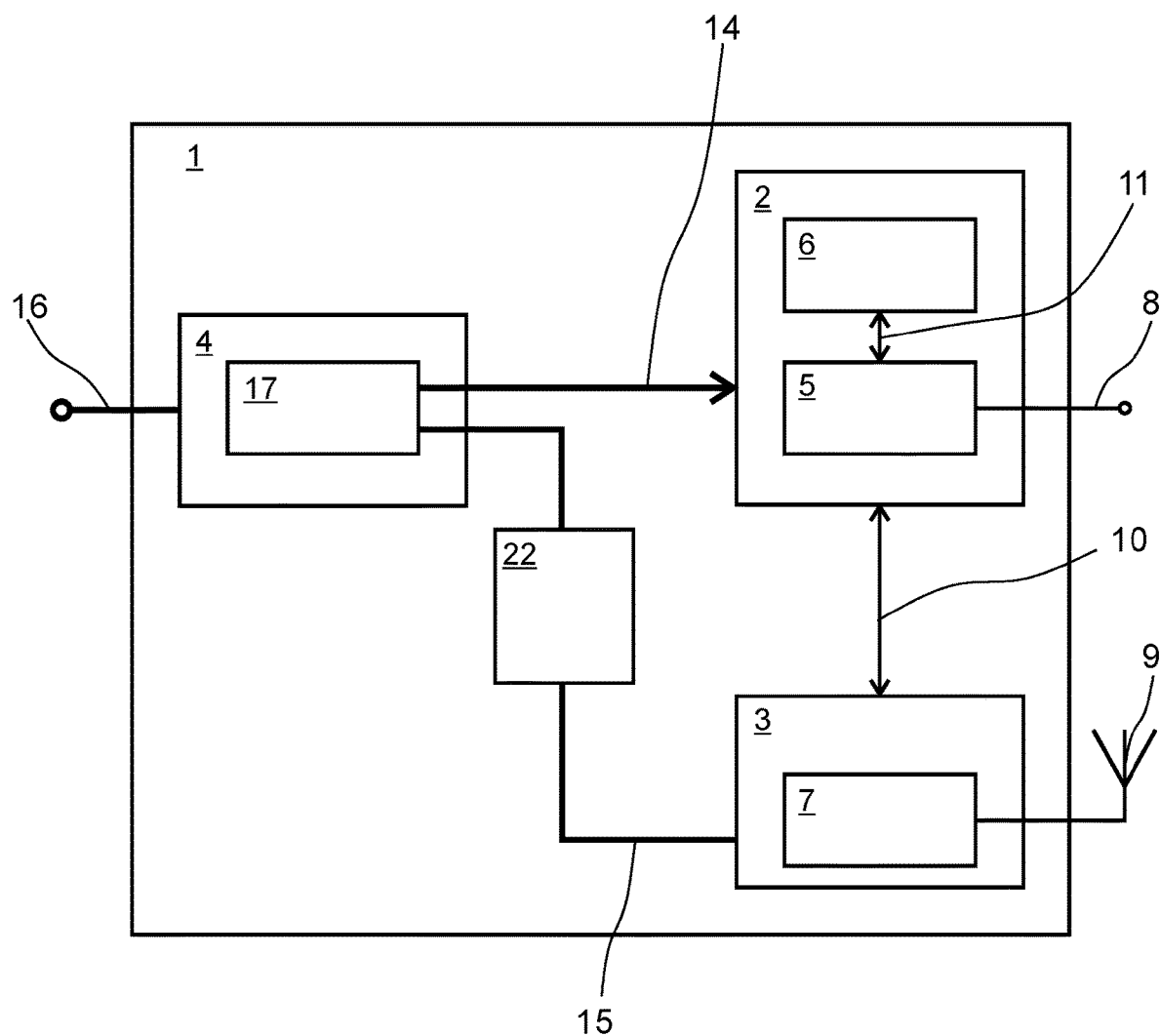
FIG. 3 provides a third embodiment of an electrical apparatus.

FIG. 3 shows essential features of a third embodiment of an electrical apparatus 1, which is designed as a field device and for use in the process industry. The electrical apparatus initially has a secured functional unit 2, an unsecured functional unit 3 and a supply device 4.

The secured functional unit 2 has a first interface device 5 and a control unit 6 and the unsecured functional unit 3 has a second interface device 7. The first interface device 5 is designed as a wire-bound interface for secure communication and the second interface device 7 is designed as a wireless interface for non-secure communication. For this, the first interface device 5 designed as a wire-bound interface has an interface connection 8 for a wire-bound transmitting medium and the second interface device 7 designed as a wireless interface has an antenna 9. The secured functional unit 2 and the unsecured functional unit 3 are designed for communication with one another via a first communication channel 10. The control unit 6 and the first interface device 5 are also designed for communication with one another via a second communication channel 11.

The supply device 4 has a single supply unit 17. During operation of the electrical apparatus 1, the supply unit 17 supplies the secured functional unit 2 and the unsecured functional unit 3 with electrical energy. For this, a first power path 14 is arranged between the supply unit 17 and the secured functional unit 2 and a second power path 15 is arranged between the supply unit 17 and the unsecured functional unit 3. The energy required for operation is supplied to the electrical apparatus 1 via a third power path 16, which must be connected to an external supply source. The energy supplied via the third power path 16 is first supplied to the supply unit 17 and then to the secured functional unit 2 and the unsecured functional unit 3.

A power limiting device 22 is arranged in the second power path 15. The power limiting device 22 is an integrated circuit and is designed to limit power transmission via the power limiting device 22, so that power that can be supplied by the supply unit 17 is, in any case, sufficient for supplying the secured functional unit 2.

The invention claimed is:

1. An electrical apparatus, comprising:
   a secured functional unit;
   an unsecured functional unit; and
   a supply device;
   wherein the secured functional unit has a first interface device for secure communication and a control unit, and the unsecured functional unit has a second interface device for non-secure communication;
   wherein the secured functional unit and the unsecured functional unit are designed for communicating with one another;
   wherein the first interface device is designed as a wire-bound interface and the second interface device is designed as a wireless interface;
   wherein the supply device has a supply unit;
   wherein a first power path for supplying the secured functional unit is arranged between the supply unit and the secured functional unit and a second power path for supplying the secured functional unit with electrical energy from the supply unit is arranged between the supply unit and the unsecured functional unit;
   wherein a switch is arranged in the second power path;
   wherein the switch can be set in a first switching state and in a second switching state;
   wherein the second power path in the switch is looped in the first switching state and disconnected in the second switching state; and
   wherein, during operation, the control unit sets the switch in the first switching state, monitors an intended function of the unsecured functional unit using an indicator representing power consumption of the unsecured functional unit, and sets the switch in the second switching state when a predetermined indicator limit value is exceeded.

2. The electrical apparatus according to claim 1, wherein the switch is in the second switching state when not actuated.

3. The electrical apparatus according to claim 1, wherein the indicator is a supply voltage on the second power path and the indicator limit value is a supply limit voltage, and the control unit measures the supply voltage during operation.

4. The electrical apparatus according to claim 1, wherein the indicator is a supply current through the second power path and the indicator limit value is a supply limit current, and the control unit measures the supply current during operation.

5. The electrical apparatus according to claim 4, wherein the indicator is a power consumption via the second power signal path and the indicator limit value is a power limit consumption, and the control unit determines the power consumption during operation.

6. The electrical apparatus according to claim 1, wherein the electrical apparatus is designed for use in the process industry.

7. The electrical apparatus according to claim 1, wherein the electrical apparatus is designed as a field device.

8. An electrical apparatus, comprising:
   a secured functional unit;
   an unsecured functional unit; and
   a supply device;
   wherein the secured functional unit has a first interface device for secure communication and a control unit, and the unsecured functional unit has a second interface device for non-secure communication;
   wherein the secured functional unit and the unsecured functional unit are designed for communicating with one another;
   wherein the first interface device is designed as a wire-bound interface and the second interface device is designed as a wireless interface;
   wherein the supply device has a first supply unit and a second supply unit;
   wherein the first supply unit and the second supply unit are separate from one another; and wherein, during operation, the first supply unit supplies the secure functional unit and the second supply unit supplies the unsecured functional unit with electrical energy.

9. An electrical apparatus, comprising:
a secured functional unit;
an unsecured functional unit; and
a supply device;
wherein the secured functional unit has a first interface device for secure communication and a control unit, and the unsecured functional unit has a second interface device for non-secure communication;
wherein the secured functional unit and the unsecured functional unit are designed for communicating with one another;
wherein the first interface device is designed as a wire-bound interface and the second interface device is designed as a wireless interface;
wherein the supply device has a supply unit;
wherein a first power path for supplying the secured functional unit is arranged between the supply unit and the secured functional unit and a second power path for supplying the secured functional unit with electrical energy from the supply unit is arranged between the supply unit and the unsecured functional unit;
wherein a power limiting device is arranged in the second power path; and
wherein the power limiting device is designed to limit power transmission via the power limiting device so that a power that can be delivered by the supply unit is, in any case, sufficient for supplying the secured functional unit.

10. The electrical apparatus according to claim 9, wherein the power limiting device is an integrated circuit.

\* \* \* \* \*